W. WITTNER.
DIAL TEST INDICATOR.
APPLICATION FILED DEC. 22, 1921.
1,431,614.
Patented Oct. 10, 1922.
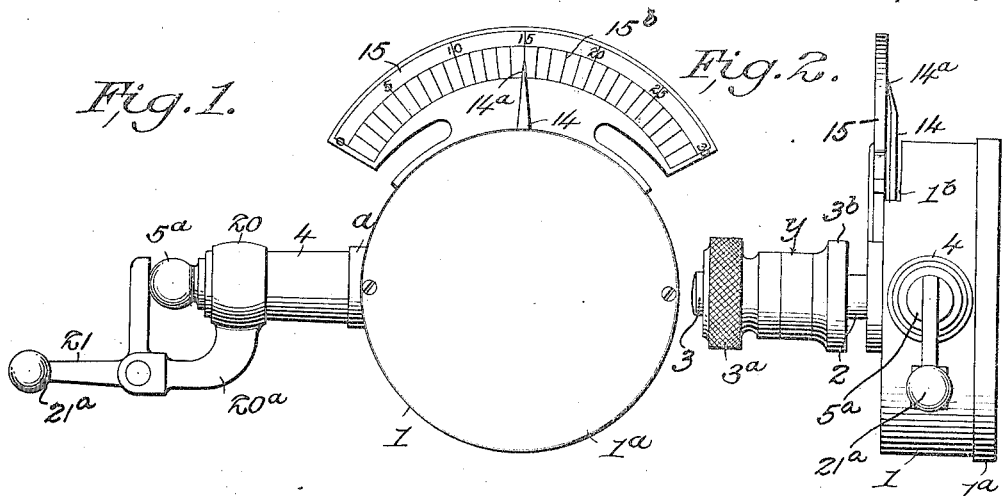
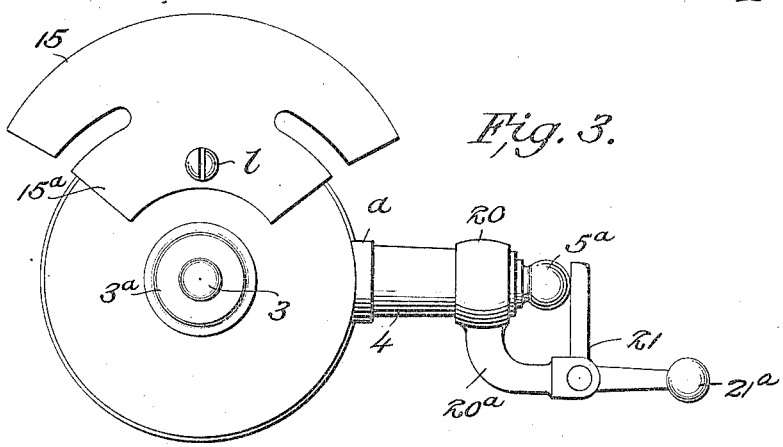
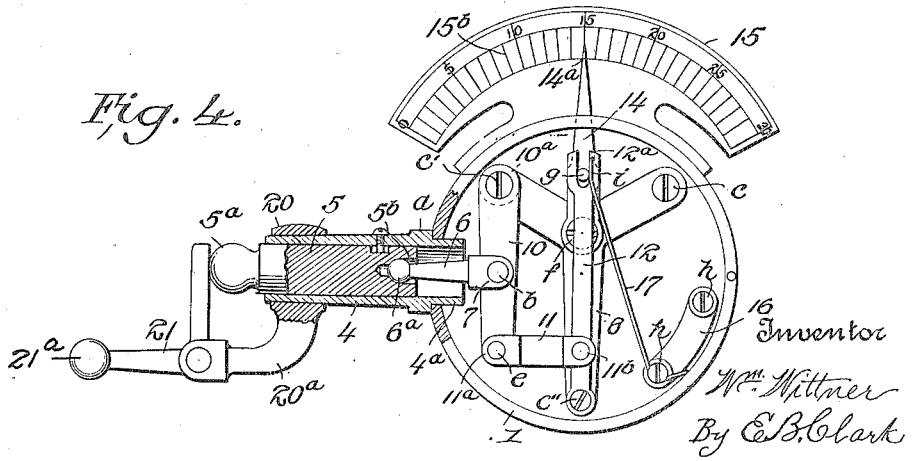
Inventor
Wm. Wittner
By E.B. Clark
Attorney.

Patented Oct. 10, 1922.

1,431,614

UNITED STATES PATENT OFFICE.

WILLIAM WITTNER, OF JERSEY CITY, NEW JERSEY.

DIAL TEST INDICATOR.

Application filed December 22, 1921. Serial No. 524,250.

*To all whom it may concern:*

Be it known that I, WILLIAM WITTNER, a citizen of the United States, residing at Jersey City, in the county of Hudson and State of New Jersey, have invented certain new and useful Improvements in Dial Test Indicators, of which the following is a specification.

This invention relates to a test indicator of the dial variety, having a graduated arc scale and adapted for indicating exactly variations of one thousandth of an inch or less in any surface of a tool or part of a machine under construction.

The object of my invention is to provide a test indicator of simple construction, having few parts, which can be made at a low cost, and which will instantly and accurately show variations of dimensions of a surface, and is adapted for use on a high gage, a lathe, a planer, a shaper, a milling machine, a combination square, calipers, and other mechanical devices.

The matter constituting my invention will be defined in the claims.

I will now describe the details of construction of my improved test indicator by reference to the accompanying drawings, in which:

Figure 1 represents a front elevation of the device.

Fig. 2 represents a side elevation.

Fig. 3 represents a rear elevation.

Fig. 4 represents on an enlarged scale a sectional elevation with the front cover removed.

The operating mechanism is mounted in a circular case 1, having a cover, $1^a$, which may be held in place by small screws, as indicated in Fig. 1. The body of the case may be cast and turned in a lathe or may be spun or stamped up of sheet metal. To the central portion of the back is secured a post or arm 2, having a screw threaded stem 3, a collar $3^b$ and a knurled clamping nut $3^a$. A perforated end $y$ of a supporting arm is engaged on post 2 between the collar and clamping nut. To the wall of the case is secured a tubular stem 4, having a circular shoulder $a$ and an interior extension $4^a$. A slidable contact pin 5, having an outer contact knob $5^a$, is fitted in the stem 4 and is provided in its inner end with a socket $5^b$ adapted to receive the terminal ball $6^a$ of a connecting bar 6, making a ball bearing. This bar may be made tapering from its inner end, where it is flattened and forked at 7 to embrace a pendent swinging bar 10, to which it is pivoted by a pin $b$.

In the case 1 is preferably secured a cruciform frame 8 by screws $c$, $c'$, $c''$ passing into the back plate. The bar 10 is made at its upper end with an inner boss $10^a$ having a perforation through which is inserted a screw $C^1$, which also serves as a pivot for the bar. The lower end of bar 10 is embraced by the forked end $11^a$ of a link 11 and connected thereto by a pivot pin $e$. The link 11 has an inner forked end $11^b$ which embraces a multiplying upright lever bar 12 near its lower end. This bar 12 is pivotally connected or fulcrumed at its lower end (to the screw) $c''$, and will be provided with an inner boss or washers to space it from the frame 8. The lever 12 has a forked upper end $12^a$ in which is engaged a pin $g$ on a pointer arm 14. This arm has an enlarged lower end and an eye through which is passed a pivotal pin $f$ screwed into the central part of the frame 8, and a pointer end $14^a$ extending out through a slot $1^b$, Fig. 2, in the case to the graduated scale at the top of the case. The arc-shaped scale plate 15 has an inner or lower extension in the form of a segment $15^a$ through which is passed an attaching screw $l$ into the back plate of the case. A graduated scale $15^b$ from zero to 30 is marked on the plate, each division mark signifying one thousandth of an inch. The scale arc is concentric with the pivot pin $f$. In the lower part of the case is secured by screws $h$ a spring holding block 16, and by means of one of the screws is attached a long spring 17, having a bent upper end $i$, which bears against the pin $g$ to slightly resist the pressure of the forked end $12^a$ of multiplying lever 12, also to restore the lever to normal position after having been deflected in use of the indicator on a piece of work. The pointer arm 14 may be held by the spring so that the point $14^a$ stands at zero.

I preferably use a universal attachment for making contact with a piece of material or machinery. This attachment is shown in Fig. 3 and consists of a collar 20 adapted to fit tightly over the end of the hollow stem 4, and having an arm $20^a$ provided with a forked end in which is pivotally connected a bell crank lever 21, having an arm adapted to press against the contact knob $5^a$, and the other arm of which has a contact knob $21^a$.

This attachment adapts the indicator for use in positions which could not otherwise be conveniently reached.

The operation of the parts is very simple and does not require any direct manipulation by the machinist; he need only apply the contact knobs 5ᵃ or 21ᵃ to the surface to be tested and the indication of irregular or uneven dimensions will be instantly shown by deflection of the pointer arm 14, the point of which will be moved over the scale and indicate exactly the amount of variation in the surface under treatment.

Though in the above description I have for convenience called the member 10 a pendent bar or lever, because in Fig. 4 it is shown pendent, but I wish it understood that the indicator can be used in various positions and will be perfectly operative, though said lever is not maintained in a pendent position.

Various changes in the details of construction of my test indicator may be made without departing from the spirit and scope of my invention.

Having described my invention, what I claim and desire to secure by Letters Patent is:

1. In a test indicator, the combination with a case having an interior support, of a tubular stem, a slidable contact pin therein, a pendent bar or lever pivotally connected at its upper end to said support in the case, a connecting bar bearing on said contact pin and pivoted to the pendent lever, a pointer arm pivoted on said support, a multiplying lever fulcrumed at its lower end in the case and engaging at its upper end with said pointer arm, a connection from the pendent lever to the multiplying lever, and a graduated arc for the pointer arm.

2. In a test indicator, the combination with a case, of an interior supporting frame secured thereto, a multiplying lever fulcrumed at its lower end on the frame, and having a forked upper end, a pointer arm pivoted at its lower end to the frame below said forked upper end and having a pin engaging in the slot of the fork, a pendent lever bar pivoted at its upper end to the frame and connecting at its lower end to said multiplying lever, a slidable contact pin, and means connecting it with said pendent lever bar.

3. In a test indicator, the combination with a case and an interior supporting frame secured thereto, of a multiplying lever fulcrumed at its lower end on the frame and having a forked upper end, a pointer arm having an extended point and pivoted at its lower end to the frame, means for engaging said arm with the fork of said multiplying lever, a pendent pivoted lever bar connecting at its lower end with said multiplying lever, a tubular stem secured to the case, a slidable contact pin in said stem and having an end socket, and a bar having a terminal ball in said socket and connecting with said pendent lever bar.

In testimony whereof I affix my signature in presence of two witnesses.

WILLIAM WITTNER.

Witnesses:
   Chas. W. Burger,
   Richard Gabrielsky.